United States Patent
Bell et al.

(10) Patent No.: US 7,373,348 B2
(45) Date of Patent: May 13, 2008

(54) DISTRIBUTED DIRECTORY DEPLOYMENT

(75) Inventors: Jason Murray Bell, Austin, TX (US); Mark Joseph Cavage, Cedar Park, TX (US); Kristin Marie Hazlewood, Austin, TX (US); Richard Allyn Heller, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 11/106,396

(22) Filed: Apr. 14, 2005

(65) Prior Publication Data

US 2006/0248117 A1 Nov. 2, 2006

(51) Int. Cl.
*G06F 17/30* (2006.01)
(52) U.S. Cl. ........................ 707/10; 707/102
(58) Field of Classification Search ............... 707/1–4, 707/9, 10, 100–102, 103 R, 104.1; 709/203, 709/219, 220, 223, 225, 226, 229
See application file for complete search history.

(56) References Cited

U.S. PATENT DOCUMENTS

| | | | |
|---|---|---|---|
| 5,956,718 A | 9/1999 | Prasad et al. ................. 707/10 |
| 6,085,188 A * | 7/2000 | Bachmann et al. ............. 707/3 |
| 6,490,619 B1 * | 12/2002 | Byrne et al. ................ 709/223 |
| 6,622,170 B1 * | 9/2003 | Harrison et al. ............ 709/221 |
| 6,647,393 B1 | 11/2003 | Dietterich et al. .......... 707/102 |
| 6,671,688 B1 | 12/2003 | Nikols et al. ................. 707/10 |
| 6,708,170 B1 * | 3/2004 | Byrne et al. ................... 707/9 |
| 7,016,907 B2 * | 3/2006 | Boreham et al. ........... 707/101 |
| 7,016,945 B2 * | 3/2006 | Bellaton et al. ............ 709/219 |
| 7,076,488 B2 * | 7/2006 | Bollich ........................ 707/10 |
| 7,130,839 B2 * | 10/2006 | Boreham et al. .............. 707/3 |
| 7,149,930 B2 * | 12/2006 | Ogawa et al. ................ 714/42 |
| 7,184,995 B2 * | 2/2007 | Kaw et al. ...................... 707/1 |

OTHER PUBLICATIONS

"Oracle® Internet Directory Administrator's Guide", 10g(9.0.4), Part No. B12118-01, 3 chapters, http://www.tju.cn/docs/oas90400/manage.904/b12118/entries4.htm, retrieved Dec. 8, 2004.
"The E-Business Direcftory: NDS eDirectory and the Billion Object Tree", Novell White Paper, Oct. 1999.
Henshaw et al., "Partitioning in X.500", ACM-SAC '93/2/93/IN, USA, 1993, pp. 294-301.

* cited by examiner

Primary Examiner—Christian Chace
Assistant Examiner—Jacques Veillard
(74) Attorney, Agent, or Firm—Duke W. Yee; Jeffrey S. LaBaw; Gerald H. Glanzman

(57) ABSTRACT

Each LDIF entry of a directory tree is read, split to a domain of LDIF fragments (corresponding to backend servers) and written to each LDIF fragment. The split may be accomplished through a hash function, establishing, for that iteration of LDIF entry, a write file. The LDIF entry is appended to the write file. A subsequent LDIF entry is read. A corresponding LDIF fragment is determined, which need not be different from the LDIF fragment to which the first LDIF entry was written. The current LDIF entry is written to the currently selected write file. The process continues until all LDIF entries are exhausted from the directory tree. LDIF fragments are each copied to distinct backend servers, where, each LDIF fragment may be loaded into a distributed directory data structure.

7 Claims, 2 Drawing Sheets

BaseDirectory: /export/home/myLDIFs

Action type: splitonly   303 inputfile: <pathname>/mydata.ldif defaultOutputFile: default.ldif

SplitBY: rdnhash   308
302

BaseDN: o=ibm, c=US

URL: ldap://ServerA:389

File: out1.ldif   309
305
URL: ldap://serverB:169

File: out2.ldif   311

START
↓
PARSE COMMAND LINE OPTIONS — 401
↓
CONSTRUCT A CONFIGURATION OBJECT — 402
↓
READ A LDIF ENTRY — 403
↓
IS DESCENDANT OF baseDN? — 407
- NO → WRITE LDIF ENTRY TO DEFAULT OUTPUT FILE — 409
- YES → HASH FUNCTION IDENTIFIES WHICH LDIF FRAGMENT IS THE WRITE FILE — 413
  ↓
  WRITE LDIF ENTRY TO WRITE FILE — 415
↓
IS THERE ANOTHER LDIF ENTRY? — 417
- YES → (back to 403)
- NO ↓
COPY EACH LDIF FRAGMENT TO A BACKEND SERVER — 421
↓
LOAD EACH LDIF FRAGMENT TO THE BACKEND WHERE IT IS — 423
↓
END

DISTRIBUTED DIRECTORY DEPLOYMENT

BACKGROUND OF THE INVENTION

1. Technical Field

The present invention relates to the field of configuring and provisioning additional computing resources, and more particularly to an improved conversion from single computer directory service to a distributed directory service.

2. Description of Related Art

X.500 directory model is a distributed collection of independent systems which cooperate to provide a logical data base of information to provide a global Directory Service. Directory information about a particular organization is maintained locally in a Directory System Agent (DSA) or directory server. This information is structured within specified standards. Adherence to these standards makes the distributed model possible. It is possible for one organization to keep information about other organizations, and it is possible for an organization to operate independently from the global model as a stand alone system. DSAs that operate within the global model have the ability to exchange information with other DSAs by means of the X.500 protocol.

DSAs that are interconnected form the Directory Information Tree (DIT). The DIT is a virtual hierarchical data structure. An X.500 pilot using QUIPU software introduced the concept of a "root" DSA which represents the world; below which "countries" are defined. Defined under the countries are "organizations". The organizations further define "organizational units" and/or "people".

The lightweight directory access protocol (LDAP) is a streamlined version of the x.500 directory service. It eliminates the ISO protocol stack, defining, instead, a protocol based on the IP protocol suite. LDAP also simplifies the data encoding and command set of X.500 and defines a standard API for directory access. LDAP has undergone several revisions and may be revised again. For example, some versions of LDAP incorporate various measures that improve security.

LDAP and the X.500 standard define the information model used in the directory service. All information in the directory is stored in "entries", each of which belongs to at least one "object class". As an example, in a White Pages application of X.500, object classes are defined as country, organization, organizational unit and person.

The object classes to which an entry belongs defines the attributes associated with a particular entry. Some attributes are mandatory others are optional. System administrators may define their own attributes and register these with regulating authorities, which will in turn make these attributes available on a large scale.

Every entry has a Relative Distinguished Name (RDN), which uniquely identifies the entry. A RDN is made up of the DIT information and the actual entry.

Deploying a distributed directory has been problematic in the past for a variety of reasons. First, the configuration of each backend server can be complicated, especially as the number of backend servers increases. This often means additional configuration file entries, replication agreements or referral objects which must be added to each backend server by the administrator.

Second, the data must be transferred from one main server or LDAP Data Interchange Format (LDIF) file to each backend server. This is often done through a proxy server or servers after the empty distributed directory servers are configured. Loading data into the empty directory is often very slow, as each entry was loaded through the proxy server one by one. Such loading failed to take advantage of the parallelism offered by the incipient distributed directory. Loading would benefit greatly if some parallel copying and loading could be done.

Thus, although a running distributed directory rapidly responds to client requests, such a distributed directory is cumbersome to migrate to from the typical single server configured directory support.

SUMMARY OF THE INVENTION

The present invention provides a method, apparatus and computer instructions for creating at least two LDIF (Lightweight Directory Access Protocol Data Interchange Format) fragments from a directory information tree is shown. A setup configuration file is read having LDIF fragment names that reference places in storage, e.g. LDIF fragment files. Successive LDIF entries from the directory information tree (DIT) are read. A determination is made whether each LDIF entry should be stored to a first LDIF fragment or a second LDIF fragment, based on a split function. Depending on the LDIF fragment selected, the LDIF entry is written to the selected LDIF fragment. Once all LDIF entries have been split or otherwise written, resultant files, including the LDIF fragments are bulkloaded in a concurrent manner, one to each backend server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 shows an exemplary setup configuration file upon which an embodiment may operate; and FIG. 4 shows a flow diagram of the steps performed by an illustrative embodiment of the present invention.

DETAILED DESCRIPTION OF THE PREFERRED EMBODIMENT

Figure 1:
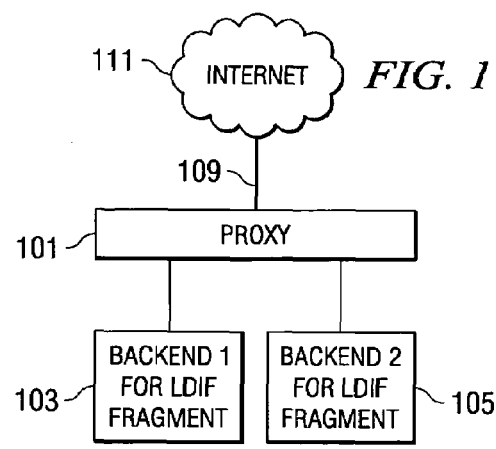
FIG. 1 shows a typical distributed directory environment in block form in accordance with an illustrative embodiment of the present invention.

FIG. 1 shows a block diagram of a typical distributed directory network in accordance with an illustrative embodiment of the present invention. A first backend directory server 103 supports a portion of the overall directory of the domain. The workload is shared with a second backend directory server 105. Each backend directory server may be simply referred to as a backend. The combined backends may present themselves to the network as if they were a single device with, for example, a common Internet Protocol (IP) address. This is ordinarily accomplished through the use of a proxy server 101, which may provide security and load-sharing functions. Queries for directory service may arrive to the domain through a network connection 109 that may connect with, among other things, the internet 111. Frequently, such distributed directory networks are established with more than two backend servers.

Figure 2:
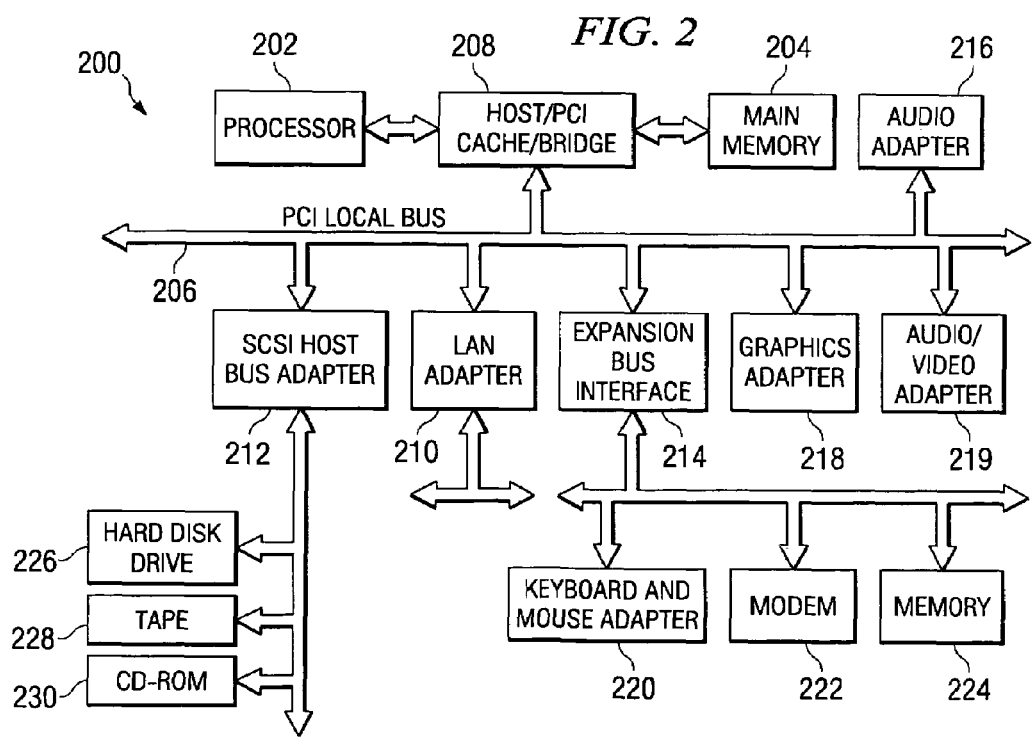
FIG. 2 shows a first embodiment setup computer in block form in accordance with an illustrative embodiment of the present invention.

With reference now to FIG. 2, a block diagram illustrating a data processing system is depicted in which the present invention may be implemented. Data processing system 200 is an example of a computer which may operate in the capacity of a backend distributed directory server, a single directory server or a proxy server. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI Bridge 208. PCI Bridge 208 also may include an integrated memory controller and cache memory for processor 202. Additional connections to PCI local bus 206 may be made through direct component interconnection or through add-in boards. In the depicted example, local area network (LAN) adapter 210, small computer system interface (SCSI) host bus adapter 212, and expansion bus interface 214 are connected to PCI local bus 206 by direct component connection. LAN adapter 210 may interconnect a computer, e.g. the Proxy 101 to one or more backends, 103 and 105 of FIG. 1, i.e. one LAN adapter for each of proxy, backend 103 and backend 105. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as Windows XP, which is available from Microsoft Corporation. An object oriented programming system such as Java may run in conjunction with the operating system and provide calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

FIG. 3 shows an example of a setup configuration file 300 that may be established to guide the operation of the embodiment. A setup configuration file may include an input file name 303; a first fragment file name 305; and a second fragment file name 307. A baseDN 302 specifies a node in the directory information tree, wherein the baseDN 302 specifies a split point of the DIT. In the case of the setup configuration file 300, the baseDN 302 has two attribute pairs, "o=ibm, c=US". The node defined by the attribute pair "c=US" is a parent. In this case there are no parent nodes to "c=US", since that is the root node to the DIT. Child nodes to "o=ibm, c=US" are nodes that have distinguished names that include an additional attribute pair to the left of "o=ibm". Children of the child nodes would have yet another attribute pair added to the left. All nodes of the DIT that have the split point described in baseDN 302 among the attribute pairs, is considered a descendant of the baseDN 302. Nodes of the DIT that lack one or more attribute pairs of the baseDN are said to be ancestors of the baseDN. This includes the parent "c=US".

Optionally, the setup configuration file may include a first backend server Uniform Resource Locator (URL) 309 and a second backend server URL 311. It is appreciated that many of the details mentioned in the setup configuration file may alternatively be presented on a command line or otherwise be available to a running program in a data structure called a setup configuration. Consequently, the setup configuration may be edited by hand prior to running a program implementing the embodiment, or the setup configuration may be provided at the time of running.

FIG. 4 shows initial steps in accordance with an embodiment. The steps of FIG. 4 may be executed by a proxy 101, backend distributed directory server 103 or backend distributed directory server 105. When operating the embodiment, the computer that operates the steps may be called the setup computer. An embodiment may receive important options and files upon which it operates on the command line. The setup program may parse (step 401) the command line to locate and obtain a setup configuration file of FIG. 3 from the command line. In addition, debug levels may also be parsed from the command line. In order to rapidly reference data for repeated access, the setup program may read, parse and assign to variables data from the setup configuration file in a process generally known as constructing a configuration object (step 402). A configuration object may be a data structure.

The setup computer may read a setup configuration file, such as described in FIG. 3, or otherwise access a file or data structure that designates at least two files: a first fragment file name, and a second fragment file name. As a data structure, the configuration object may serve as a setup configuration, which the setup computer may read. Having done that, the setup computer may read (step 403) a LDIF entry of an input file, e.g. specified by input file name 303, or directory information tree. Each LDIF entry may be read (step 403) in consecutive order, i.e. a successive LDIF entry. An initial step determines if the successive LDIF entry is a descendant (step 407) of the baseDN, 302 of FIG. 3. Provided the successive LDIF entry is a descendant, the setup computer may use a hash function operating on the distinguished name (DN) of the successive LDIF entry in such a way as to identify the LDIF fragment to write to as a write file (step 413). Such an LDIF fragment may be chosen from a set of fragments comprising a first LDIF fragment name, and a second LDIF fragment name, e.g. SERVERA, as specified in more detail by first backend server URL 309, and SERVERB. Each choice for each LDIF entry is a selected write file. Such LDIF fragment names may be specified in the setup configuration file. These files are the targets within which all the descendant LDIF entries will be placed, but initially, it is expected that the LDIF fragments will be empty.

The hash function maps each descendant LDIF entry to the domain of LDIF fragment names or backend servers into which the LDIF entry may be placed. It is appreciated that backend servers may be enumerated, 1, 2, 3, etc., and that a simple array may contain the LDIF fragment name or other unique identifier with which the output file is accessed, such array indexed by integers. So, the domain that the hash function maps to (step 413) may merely be integers from one to the number "n", wherein "n" is the number of servers that are to be setup to form the distributed directory.

The setup computer then writes or appends the LDIF entry to the selected write file (step 415). A write may be to a hard drive (226 of FIG. 2) or may be to a storage beyond the setup computer, e.g. as may occur by transmitting a stream of data to a serving computer through the facility of the LAN adapter (210 of FIG. 2). Provided there are another LDIF entries (step 417) another LDIF entry is read (step 403) by the setup computer. Thus each reading may advance the next LDIF entry, and the next LDIF entry, or successive LDIF entry, changes with each occurrence of read (step 403). Absent additional LDIF entries being available (step 417), processing passes to the bulkloading steps 421 and 423.

If a successive LDIF entry fails to be a descendant of the baseDN (step 407) the entry is handled specially. The entry is written (step 409) to a default output file, e.g. root fragment 308 of FIG. 3. Following the write, a determination whether there are other LDIF entries is made (step 417). If yes, more successive LDIF entry or entries are read (step 403). If not, bulkloading steps 421 and 423 are executed. One or more steps of FIG. 4 may be accomplished by a processor (202 of FIG. 2).

A high speed offline loader is the "bulkload" utility. Executing the bulkload utility is called "bulkloading". Bulkloading refers to the transference of at least two distinct data structures from one long term storage, e.g. a hard drive, to another long term storage, often located in another computer.

A first step of the bulkload, is the step of copying each LDIF fragment (step 421) to a backend server. The designated backend server to copy to may be specified in the setup configuration file. The second step of the bulkload is to load (step 423) each LDIF fragment to the backend where it is located.

Since a program may accumulate a series of write operations to a buffer before committing such writes to long term storage, the setup computer may receive a first LDIF entry of the directory information tree and a second LDIF entry of the directory information tree for writing, wherein the first LDIF entry and the second LDIF entry are non-consecutive in the directory information tree from which it originates. By non-consecutive, it is meant that at least one LDIF entry appears between the first LDIF entry and the second LDIF entry. After receiving the first LDIF entry and the second LDIF entry, the bulkload may copy the combined LDIF entries to the backend server. The copy of the combined LDIF entries may be such that the first LDIF entry and the second LDIF entry are consecutive, when they arrive at the backend server. Bulkload may also load the first LDIF entry and the second LDIF entry to the backend server.

The copy (step 421) may be several concurrent copies in the sense that a microprocessor may share time processing a copy operation of the first LDIF fragment and the copy operation of the second LDIF fragment. As such, the copying from the embodiment to a backend server may accomplish multiple copyings to multiple backend servers during a time interval—in effect, causing a parallel copying to occur vis-à-vis the two or more LDIF fragments. Likewise, the load (step 423) may be several concurrent loadings of LDIF fragments into their respective backend servers.

TABLE 1 dn: cn=ServerA, cn=ProxyDB, cn=Proxy Backends,
cn=IBM Directory, cn=Schemas, cn=Configuration
  cn: ServerA
  ibm-slapdProxyBindMethod: Simple
  ibm-slapdProxyConnectionPoolSize: 5
  ibm-slapdProxyDN: cn=root
  ibm-slapdProxyPW: secret
  ibm-slapdProxyTargetURL: ldap://serverA:389
  objectClass: top TABLE 1-continued objectClass: ibm-slapdProxyBackendServer
  objectClass: ibm-slapdConfigEntry
  dn: cn=ServerB cn=ProxyDB, cn=Proxy Backends, cn=IBM
Directory, cn=Schemas, cn=Configuration
  cn: ServerB
  ibm-slapdProxyBindMethod: Simple
  ibm-slapdProxyConnectionPoolSize: 5
  ibm-slapdProxyDN: cn=root
  ibm-slapdProxyPW: secret
  ibm-slapdProxyTargetURL: ldap://serverB:389
  objectClass: top
  objectClass: ibm-slapdProxyBackendServer
  objectClass: ibm-slapdConfigEntry
  dn: cn=ibm split, cn=ProxyDB, cn=Proxy Backends,
cn=IBM Directory, cn=Schemas, cn=Configuration
  cn: ibm split
  ibm-slapdProxyNumPartitions: 2
  ibm-slapdProxyPartitionBase: o=ibm, c=us
  objectclass: top
  objectclass: ibm-slapdConfigEntry
  objectclass: ibm-slapdProxyBackendSplitContainer
  dn: cn=split1, cn=ibm split, cn=ProxyDB, cn=Proxy
Backends, cn=IBM Directory, cn=Schemas, cn=Configuration
  cn: split1
  ibm-slapdProxyBackendServerDN:
cn=ServerA, cn=ProxyDB, cn=Proxy Backends, cn=IBM
Directory, cn=Schemas, cn=Configuration
  ibm-slapdProxyPartitionIndex: 1
  objectclass: top
  objectclass: ibm-slapdConfigEntry
  objectclass: ibm-slapdProxyBackendSplit
  dn: cn=split2, cn=ibm split, cn=ProxyDB, cn=Proxy
Backends, cn=IBM Directory, cn=Schemas, cn=Configuration
  cn: split2
  ibm-slapdProxyBackendServerDN:
cn=ServerB, cn=ProxyDB, cn=Proxy Backends, cn=IBM
Directory, cn=Schemas, cn=Configuration
  ibm-slapdProxyPartitionIndex: 2
  objectclass: top
  objectclass: ibm-slapdConfigEntry
  objectclass: ibm-slapdProxyBackendSplit Table 1 shows an example of a proxy configuration file which an embodiment of the invention may generate, providing a command line option or other input requests such a file. The proxy configuration file is known in the art to specify the manner in which a proxy computer should direct traffic to a supporting set of computer or computers.

Generally, the proxy configuration file is derived from the setup configuration file. The first entry is the LDIF entry containing the connection information for the first server holding the first LDIF fragment. The second entry is the same, but for the second server. Thus, the first two entries describe to the proxy the ServerA and ServerB specified in the FIG. 3, and are found to the right hand side of ibm-slapdProxyTragetURL in each entry. A proxy configuration file varies in format from manufacturer to manufacturer. Suffice it that the proxy configuration file describes to the proxy server the logical interconnectivity and division of labor among the servers that jointly provide the directory information service.

The third entry is the top level entry for the o=ibm, c=us split point. It identifies the number of partitions, two, in the case of FIG. 3, and the baseDN.

The fourth entry represents the first portion of the split or partition between sibling nodes of the DIT prior to split. The fifth entry represents the second portion of the split. The attributes in the fourth and fifth entries mean the following. ibm-slapdProxyBackendServerDN refers to the entry that contains the connection information for a partition held by a backend server. ibm-slapdProxyPartitionIndex refers to an integer that uniquely identifies the partition. In our example, where there is two partitions, ibm-slapdProxyPartitionIndex may be 1 or 2, referring to the first partition portion of the DIT and to the second partition portion of the DIT, respectively.

In addition to a command line invocation, it is appreciated that the setup configuration file may provide a command to generate the proxy configuration file. For example the "ActionType" line in FIG. 3, may be assigned the value "SplitConfig" or similar text keyword that requests at least a proxy configuration file be generated alone or together with the generation of LDIF fragments.

The efficiency of the bulkload is realized in the present invention in that, in general, LDIF entries are aggregated into substantial LDIF fragments prior to loading into the distributed directory data structure of each backend server. Thus a much more rapid deployment of the distributed directory among several backend servers may be achieved as compared to the piecemeal methods of the past.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for creating at least two LDIF (Lightweight Directory Access Protocol Data Interchange Format) fragments the method comprising the computer implemented steps of:
    reading a setup configuration having a first LDIF fragment name corresponding to a first LDIF fragment and a second LDIF fragment name corresponding to a second LDIF fragment;
    reading a plurality of successive LDIF entries from a directory information tree (DIT);
    determining for each LDIF entry whether each LDIF entry should be written to a first LDIF fragment or to a second LDIF fragment based on a split function; and
    writing each LDIF entry to the first LDIF fragment or to the second LDIF fragment based on the split function.

2. The method of claim 1 further comprising:
    bulkloading the first LDIF fragment to a first backend server; and
    bulkloading the second LDIF fragment to a second backend server, wherein the bulkloading of the first LDIF fragment and the bulkloading of the second LDIF fragment occur in parallel.

3. The method of claim 1 further comprising:
    determining for each LDIF entry whether each LDIF entry is a descendant node of a BaseDN, wherein the BaseDN specifies a split point of the DIT; and
    writing each LDIF entry to a root output file based on determining each LDIF entry is not a descendant node of the BaseDN.

4. The method of claim 3 further comprising:
    bulkloading the root output file to a third backend server.

5. The method of claim 4 further comprising:
    bulkloading the first LDIF fragment to a first backend server; and
    bulkloading the second LDIF fragment to a second backend server, wherein the bulkloading of the first LDIF fragment, bulkloading the second LDIF fragment and the bulkloading of the root output file occur in parallel.

6. The method of claim 5 further comprising:
    constructing a setup configuration prior to reading the setup configuration.

7. The method of claim 6 further comprising:
    parsing a command line to locate a setup configuration file.

* * * * *